United States Patent
Cordes

[19]

[11] Patent Number: 6,145,623
[45] Date of Patent: Nov. 14, 2000

[54] OIL DRAIN LINE

[76] Inventor: Robert E. Cordes, 737 Crenshaw, Rathdrum, Id. 83858

[21] Appl. No.: 09/329,960

[22] Filed: Jun. 9, 1999

[51] Int. Cl.[7] ............................... F16C 3/14; F16N 33/00
[52] U.S. Cl. .............................................. 184/1.5; 184/6.5
[58] Field of Search .............................. 184/1.5, 6.5, 6.8, 184/18, 105.3

[56] References Cited

U.S. PATENT DOCUMENTS

| | | | |
|---|---|---|---|
| 4,512,441 | 4/1985 | Cooper | 184/105 B |
| 5,667,195 | 9/1997 | McCormick | 251/149.6 |
| 5,906,047 | 5/1999 | Miller et al. | 29/890.132 |
| 6,003,635 | 12/1999 | Bantz et al. | 184/1.5 |

*Primary Examiner*—Charles A. Marmor
*Assistant Examiner*—Tisha D. Waddell

*Attorney, Agent, or Firm*—Reidlaw, L.L.C.; John S. Reid

[57] ABSTRACT

An apparatus for draining oil from a side-draining crankcase, the crankcase having an oil outlet, the crankcase being supported on a chassis defining edge portions distal from the oil outlet. The apparatus includes a flexible fluid conduit having a first end and a second end and forming a fluid passageway there between, the apparatus being defined by a length along an axis of fluid flow, which length is greater than a shortest distance from the oil outlet to an edge portion of the chassis nearest the oil outlet. The apparatus further includes a first coupling secured to the first end of the flexible fluid conduit and configured to be threadably and removably connectable to the oil outlet, a sealing element removably connectable to the second end of the flexible fluid conduit, and a securing mechanism configured to removably secure the second end of the apparatus proximate the first end of the apparatus.

11 Claims, 6 Drawing Sheets

OIL DRAIN LINE

FIELD OF THE INVENTION

This invention pertains to an oil drain line, and in particular to an oil drain line for a crankcase on a device having a side-mounted oil drain outlet where the device is mounted on a chassis rendering recovery of oil drained from the crankcase difficult.

BACKGROUND

Certain devices having oil crankcases, such as small internal combustion engines, are designed for a variety of applications in commercial and residential settings. Exemplary applications for engines included in this category include driving paint sprayers, air compressors, power high pressure water washers, small electrical generators, and lawn and garden tools such as roto-tillers and lawn mowers. These engines tend to be small displacement, 4 cylinder gasoline driven engines having a single cylinder or two cylinders. I will refer to the engines used in these exemplary devices as "small engines". Typically a manufacturer of one of these devices will purchase the engine separately from the object to be driven by the engine, and will then mount the components together on a platform or chassis as part of the final assembly. In order to provide a solid, vibration resistant platform, as well as to keep manufacturing costs low, the chassis on which the components are mounted is frequently a single piece of steel plate, a cast metal platform, or a stamped metal platform. The chassis can also comprise an open framework.

In order to lubricate the internal components of the engine or gearbox, as for example, the crankshaft in an engine, the device includes a crankcase for holding lubricating oil. To ensure that the maximum amount of oil is removed from the crankcase when the oil is changed, a drain point is located low in the crankcase. In automotive engines, the drain point is normally located at the bottom of the oil pan, allowing the draining of oil from the lowest possible point. However, in small engine applications and the like, since the engine or device is typically mounted on a solid platform as discussed above, a bottom drain plug is impractical. Such would require the assembler of the finished product to provide for a drain plug opening in the platform. Additionally, in applications such as a roto-tiller, a bottom drain plug would be difficult to access due to the presence of the tines of the roto-tiller beneath the engine. Consequently, small engine manufacturers and others have taken to positioning the crankcase oil drain plug on the side of the engine or gearbox, as low as possible, to allow for the maximum amount of oil to be drained without requiring the assembler to accommodate a bottom drain plug, or the end user to access a bottom drain plug.

FIG. 1 shows an exemplary device which uses a small engine of the type described above. The device 2 is a power washer which pumps water at high pressure through a hose for washing sidewalks and the like. The device 2 comprises a pump 3 which is driven by a small engine 4. The pump 3 and engine 4 are mounted on a platform 5, which, as shown here, is a solid metal plate. Located towards the bottom of the engine 4 is the oil crankcase 8. An oil drain location 9 is located at the lower side of the crankcase 8. It is immediately apparent that when a drain plug is removed from the oil drain hole 9, oil will pour across the platform 5. Beyond the obvious problems this presents in recovering the draining oil, it also requires a significant amount of clean-up to remove the oil from the device, it results in unnecessary human exposure to used oil, and it can present an environmental hazard.

Some solutions to this problem have been offered by the manufacturers. However, they do not practically solve the problem. For example, tipping the device 2 to which the engine 4 is mounted in the direction of the drain hole 9 while draining the crankcase 8 may help to direct oil runoff to one edge of the platform, but is difficult for one person to perform this act alone, and the results are still far less than perfect. Further, because of the proximity of the oil drain outlet 9 to the platform 5, positioning a container near the drain hole 9 is difficult, and unless the apparatus 2 is tipped on its side, it is of little value in collecting the draining oil. Likewise, providing a hole in the platform 5 near the crankcase drain hole 9 does not help much, as oil tends to course out of the drain hole and past the hole in the platform when the drain plug is initially removed. Also, providing such a hole in the platform is of little help for a device having significant under-platform components, such as a roto-tiller. Positioning the engine 4 closer to the edge of the platform 5 is not really an option, as this would result in uneven weight distribution of the components on the platform, and may not even be possible depending on the configuration of the device to which the engine is to be coupled.

Thus, what is needed is something to allow oil to be easily drained from a platform mounted, side-draining crankcase, and which allows the oil to be easily collected into a receptacle while producing minimal spillage of the oil.

SUMMARY OF THE INVENTION

My invention is apparatus for draining oil from a side-draining crankcase. The crankcase has an oil outlet, and is supported on a chassis having edge portions distal from the oil outlet. The apparatus includes a flexible fluid conduit having a first end and a second end and forming a fluid passageway there between. The apparatus is defined by a length along an axis of fluid flow, which length is greater than a shortest distance from the oil outlet to an edge portion of the chassis nearest the oil outlet. The apparatus further includes a first coupling secured to the first end of the flexible fluid conduit, which coupling is configured to be threadably and removably connectable to the oil outlet of the crankcase. The apparatus further includes a sealing element connectable to the second end of the flexible fluid conduit. Preferably, the apparatus includes a securing mechanism configured to removably secure the second end of the apparatus, and more preferably to secure the second end of the apparatus proximate the first end of the apparatus.

The length of the apparatus is such as to allow oil from the crankcase to be drained from the crankcase without flowing the oil over the chassis to which the crankcase is mounted. Preferably, the sealing element is threadably secured to the second end of the apparatus such that by removing the sealing element, the oil in the crankcase can freely drain from the crankcase into a receptacle without contacting the chassis on which the crankcase is mounted or components mounted to the chassis below the crankcase oil outlet.

The length of the apparatus is preferably equal to or longer than the distance between the oil outlet in the crankcase and the designated oil fill height of the crankcase, such that the second or free end of the apparatus can be elevated above the fill height, thus preventing flow of oil from the crankcase through the apparatus when the sealing element is removed.

The apparatus can further include a securing mechanism configured to secure the second end of the apparatus in a removable manner proximate the first end of the apparatus.

The securing element thus prevents the second or outlet end of the apparatus from freely moving about unless specifically freed to drain oil from the crankcase.

DESCRIPTION OF PREFERRED EMBODIMENTS OF THE INVENTION

The present invention provides an oil drain passage for the draining of side-draining crankcases. The invention is particularly useful for small internal combustion engines having crankcases positioned at or near the bottom of the engine, and which are mounted on a chassis. By "side-draining crankcase" I mean a crankcase which has an outlet forming a path for draining oil from the crankcase, the outlet being oriented such that the path of oil flowing there through and passing therefrom is in an essentially horizontal direction with respect to a surface supporting the crankcase. A side draining crankcase is to be contrasted to a bottom-draining crankcase. An example of a bottom draining crankcase is Ford 5.0 liter V-8 engine.

Typically, the chassis to which the engine or crankcase is mounted is a platform chassis having an essentially closed upper surface. The chassis can comprise a metal plate, a metal stamping, or a metal casting. The chassis can also comprise an open framework chassis, and the material of construction is not necessarily limited to metal. The invention is intended to be used with any type of chassis to which an engine or gearbox can be mounted, and use of the expression "platform" in the specification, rather than the more generic "chassis", should not be considered as limiting the application of the invention to platform chassis. As described above, the apparatus of the present invention is useful not only for preventing oil from flowing over a platform chassis, but also for prevention oil from the crankcase oil outlet from draining onto components mounted below the crankcase outlet in an open framework chassis.

Figure 1:
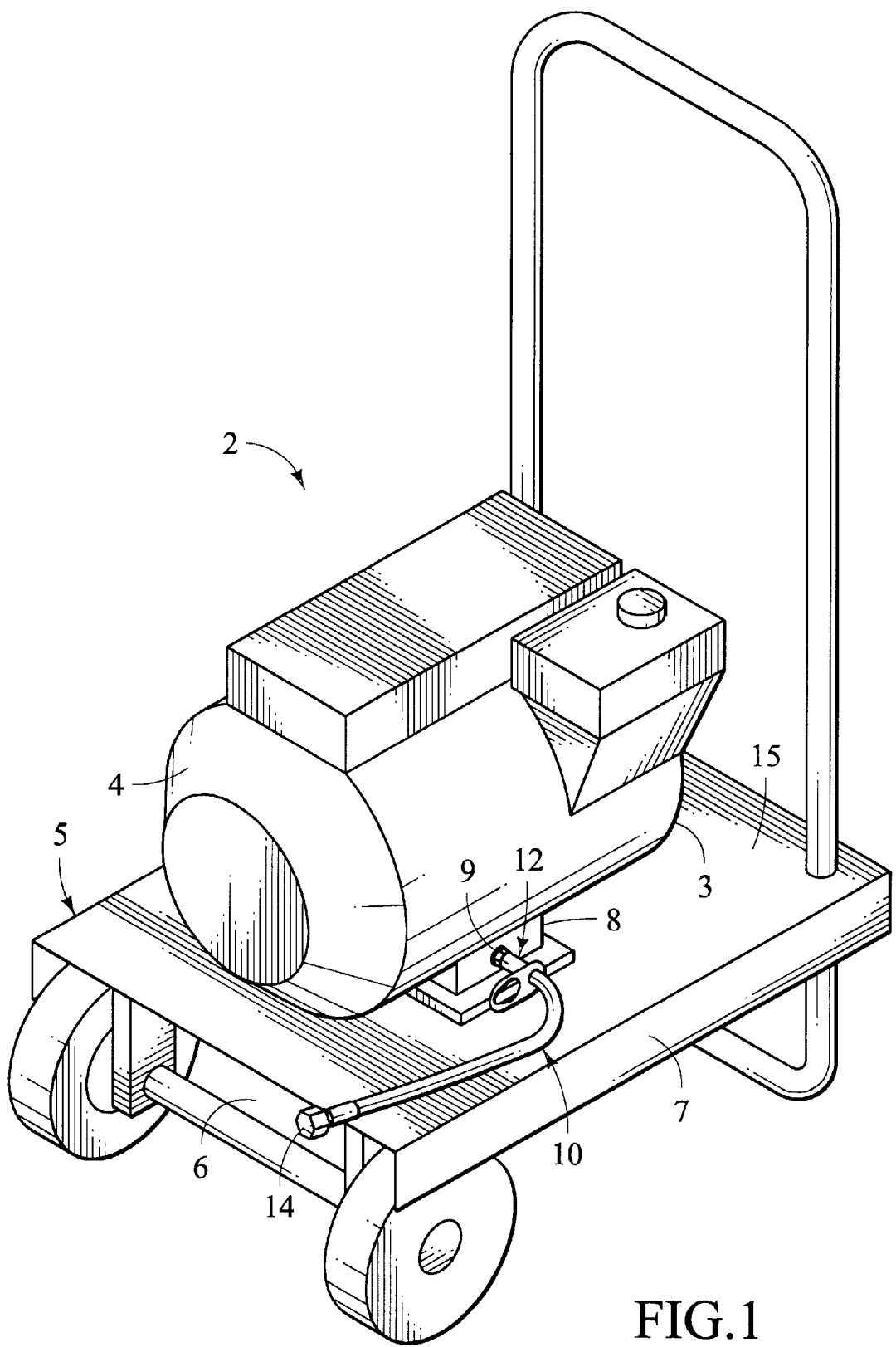
FIG. 1 is an isometric environmental view showing the apparatus of the present invention used on a small engine used to drive a power washer.

Turning to FIG. 1, an environmental view of the apparatus 10 is shown. The apparatus 10 is connected to an outlet or oil drain 9 of a crankcase 8. The crankcase is supported by platform chassis 5. The platform 5 has edges 6 and 7, which are proximate the oil outlet 9. The platform 5 has additional edges, which are not proximate the oil outlet 9. The general device 2 to which the apparatus 10 is connected is an exemplary device comprising a pressure washer having an engine 4 and a pump 3, the pump being connected to the engine. Here, the crankcase 8 is the crankcase for the engine 4. The oil outlet 9 of the crankcase is a side-draining outlet, and is located proximate to, and horizontally in alignment with the upper surface 15 of the platform 5. The apparatus 10 has a first end 12 connected to the oil outlet 9, and a second end 14 through which oil drained from the crankcase 8 can pass.

Figure 2:
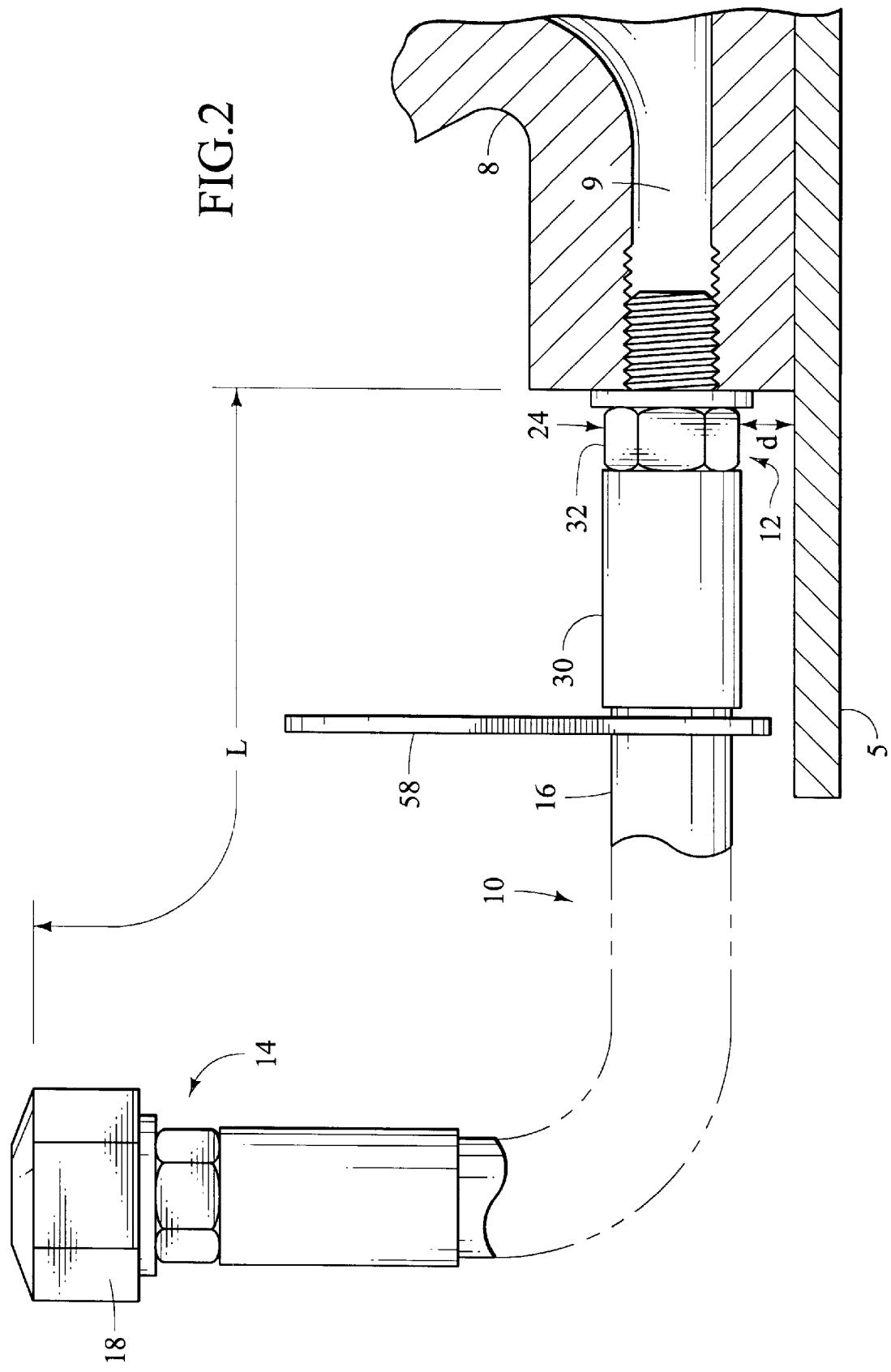
FIG. 2 is a partial sectional side elevation view of an apparatus in accordance with the present invention, attached to a crankcase.

Turning to FIG. 2, a side elevation view of the apparatus 10 is shown. The first end 12 is connected to the oil outlet 9 of crankcase 8. The second end 14 can be freed to move about. Between the first end 12 and the second end 14 is a flexible fluid conduit 16. This configuration allows oil to flow from the crankcase 8 through the apparatus to the second end 14. The second end 14 is fluidly sealed with a sealing element 18 which prevents oil from flowing out of the apparatus when the sealing element 18 is in place. The sealing element is operational such that it can be operated to an open position to allow oil to pass from the second end 14 of the apparatus, or it can be operated to a closed position to prevent the flow of oil from the second end of the apparatus 14. The sealing element will be discussed further below.

Figure 3:
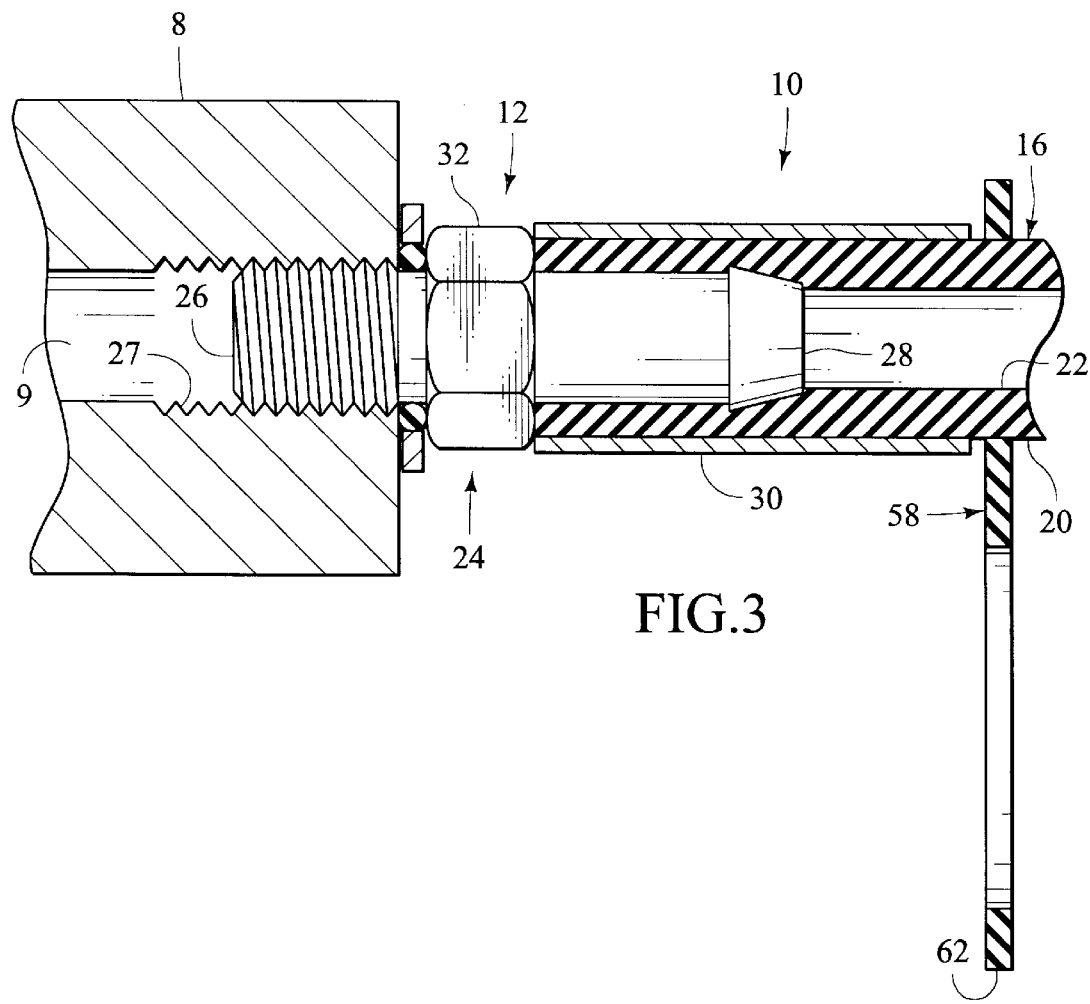
FIG. 3 is a detailed side elevation sectional view of the oil-source or crankcase end of an apparatus in accordance with the present invention.

Turning to FIG. 3, a detail of the first end 12 of the apparatus 10 is shown in sectional side elevation view. The flexible conduit 16 has an inner surface 22 and an outer surface 20. Preferably, the inner surface 22 of the flexible fluid conduit 16 comprises an oil-resistant, fluid tight material. More preferably, the inner surface is of an elastomeric material such as rubber or nylon. The outer surface 20 of the fluid conduit 16 can be of the same material as the inner surface, or it can be of a different material such as a woven metal sheath for mechanical protection of the flexible fluid conduit. In one example, the flexible fluid conduit 16 is made from reinforced rubber hose having an inside nominal diameter of 0.25 inches (6.35 mm). a nominal outside diameter of 0.5 inches (12.7 mm), an operational pressure rating of 250 psi (48.8 kg/m$^2$), and an operational temperature rating of 180 degrees F (82 degrees C).

Figure 7:
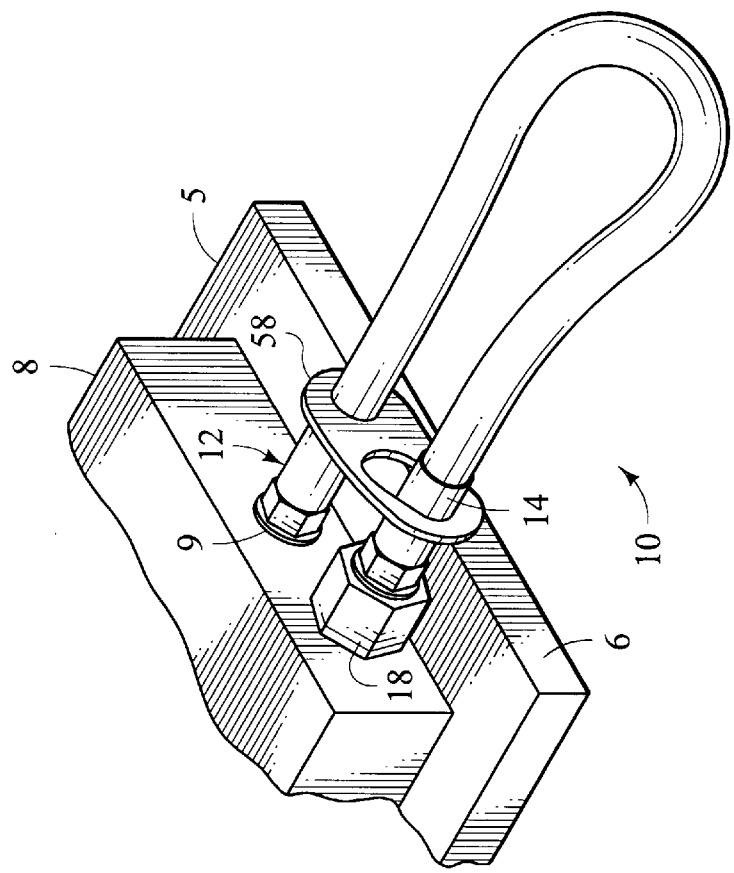
FIG. 7 is an isometric drawing showing an apparatus in accordance with the present invention in a secured position.
Figure 9:
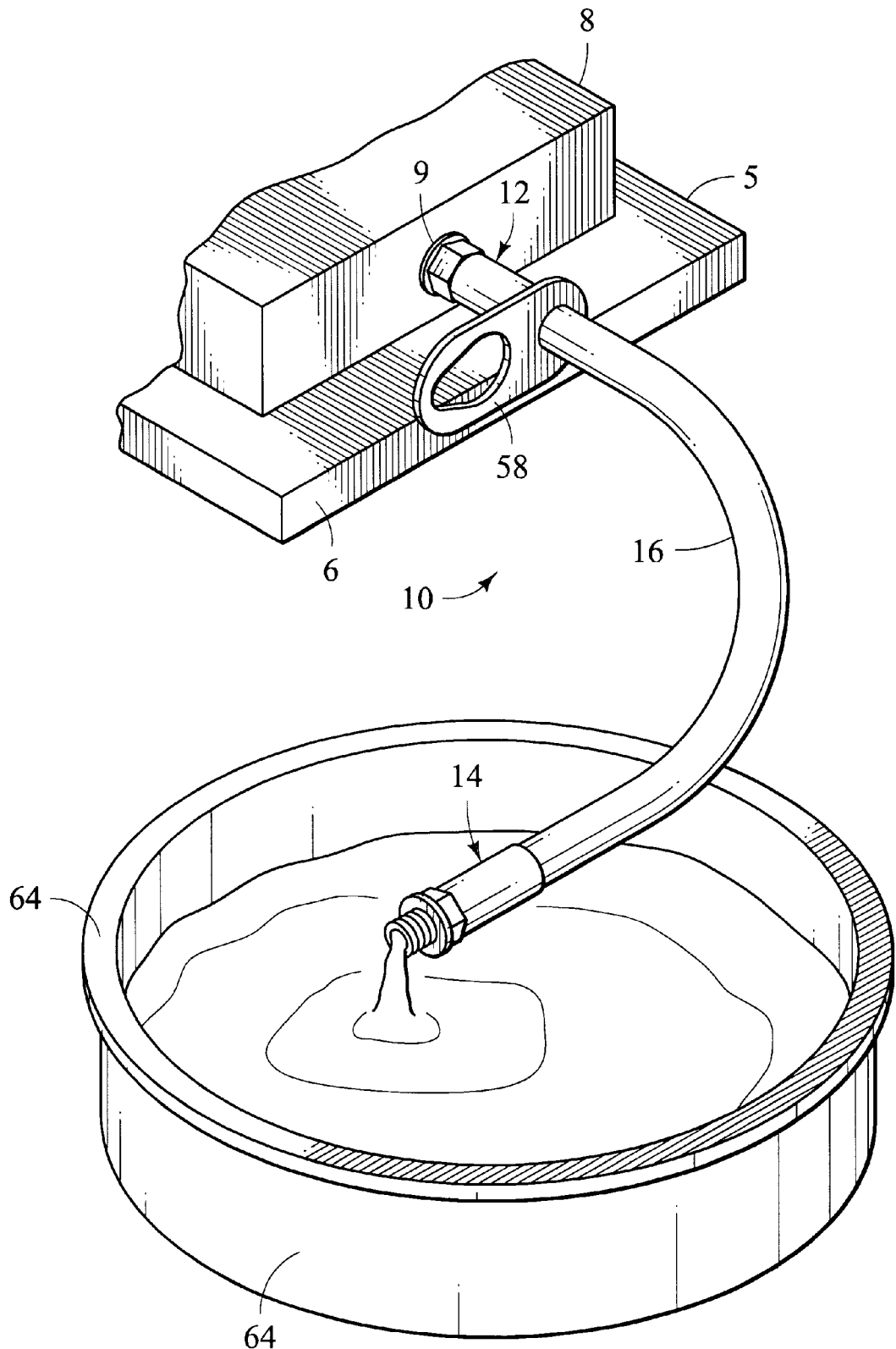
FIG. 9 is an isometric drawing showing an apparatus in accordance with the present invention in use while oil is being drained from a crankcase.

Returning to FIG. 2, the overall length of the apparatus L is preferably of a length sufficient to allow the second end 14 of the apparatus to clear the nearest edge of the chassis on which the apparatus is mounted. For example, in FIG. 1 the length of the apparatus 10 is such as to allow the second end 14 of the apparatus 10 to clear either edge 6 or edge 7 of the platform chassis 5. This allows the apparatus to drain oil from the crankcase 8 without the risk of oil spilling onto the platform. More preferably, the length L of the apparatus is such as to allow the oil from the crankcase to be directed to a receptacle as shown in FIG. 9. The length L will vary with the application in which the crankcase is found. The length L should also be of sufficient length to allow the apparatus to be folded back on itself, as shown in FIG. 7, without kinking the flexible fluid conduit 16. An exemplary length of 10 inches (25.4 cm) is found to be sufficient in most applications to allow oil from the crankcase 8 to be drained via the apparatus 10 without interference from the platform chassis 5 which supports the crankcase.

In a preferred embodiment, the first end 12 of the apparatus 10 comprises a first coupling 24 which is configured to couple the flexible fluid conduit 16 to the oil outlet 9, as shown in FIGS. 2 and 3. The 24 coupling includes a first end having a male threaded portion 26 configured to threadably engage a female threaded portion 27 of the oil outlet 9, as shown in FIG. 3. A second end of the coupling 24 is preferably shaped as a hose barb 28 to engage the elastomeric inner surface 22 of the flexible fluid conduit 16. A clamp, such as ferrule 30, can be used to ensure secure engagement of the elastomeric inner surface 22 of the flexible fluid conduit 16 with the hose barb 28. The ferrule 30 can comprise a metal ferrule which can be compressed onto the outer surface 20 of the flexible fluid conduit 16, thus compressing the elastomeric inner surface 22 onto the barb 28.

Preferably, the first coupling 24 further includes a polygonal shaped section 32 which is disposed between the threaded first end 26 and the hose barb end 28 of the coupling. Preferably, the polygonal shaped section 32 is either a four sided polygon or, more preferably, a hexagon, to allow easy engagement of the section 32 with a wrench. Such allows the apparatus 10 to be easily removed from the crankcase. The polygonal section 32 should be sized such that it can be freely rotated to threadably engage and disengage the threaded portion 26 in the oil outlet 9 without interfering with the platform chassis 5. Turning to FIG. 2, the maximum diameter of the polygonal shaped section 32 should be selected to provide a distance "d" between the lowermost possible point of the polygonal section 32 and the top of the platform 5.

Many small engines are manufactured with metric fittings, yet are sold to users who may only have "standard" tools (i.e., tools having nominal sizes based on English measures such as inches, also known as "S.A.E." after the Society of Automotive Engineers' standards). It is therefore desirable that the first coupling 24 be available with a metric threaded first end 26, and an S.A.E. nominally sized polygonal portion 32. In one example, the threaded portion 26 of the first coupling 24 is one of a nominal 10 mm with a 1.25 thread pitch or a nominal 12 mm with a 1.5 thread pitch, and the polygonal section is a nominal S.A.E. ⅝ inch hexagonal fitting. Preferably, the first coupling 24 is machined from a solid piece of bar stock such as stainless steel or brass.

Figure 4:
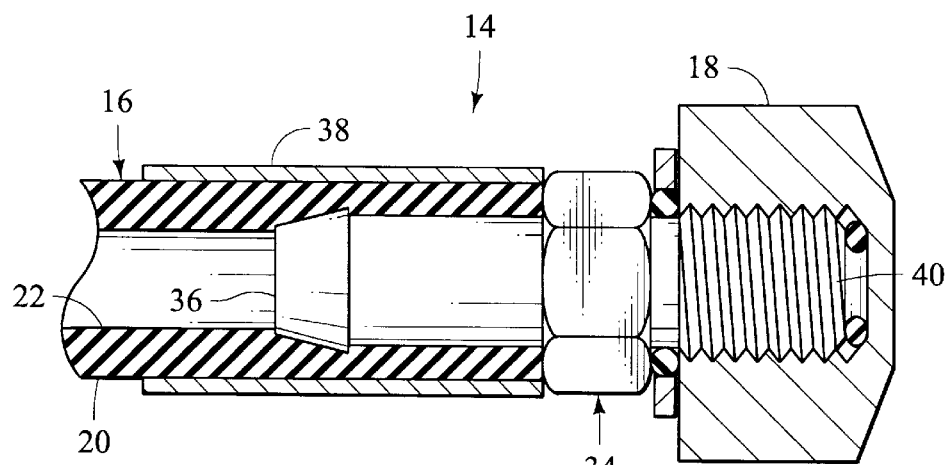
FIG. 4 is a detailed side elevation sectional view the oil outlet end of an apparatus in accordance with the present invention.

Returning briefly to FIG. 2, the second end 14 of the apparatus from which oil from the crankcase 8 can be discharged incorporates a sealing element 18 which is removably connectable to the flexible fluid conduit 16. Since a relatively large amount of vibration is typically encountered with small engines, the sealing element is preferably configured such that it can be securely engaged to the flexible fluid conduit to prevent accidental opening of the sealing element during use of the device to which the oil drain apparatus 10 is connected. One method for accomplishing this is shown in FIG. 4. FIG. 4 shows a cross sectional detail of the second end 14 of the apparatus 10 of FIG. 2. As shown in FIG. 4, the second end 14 of the apparatus incorporates a second coupling 34. The second coupling 34 is used to connect the sealing element 18 to the flexible fluid conduit 16. The second coupling 34 is similar to the first coupling 24 on the first end of the oil drain apparatus. The second coupling 34 can include a hose barb 36, similar to hose barb 28 on first coupling 24, to engage the elastomeric inner surface 22 of the flexible fluid conduit 16. In a similar manner as described above for first coupling 24, a clamp, such as ferrule 38, can be used to ensure secure engagement of the elastomeric inner surface 22 of the flexible fluid conduit 16 to the hose barb 36 on the second coupling 34.

Figure 5:
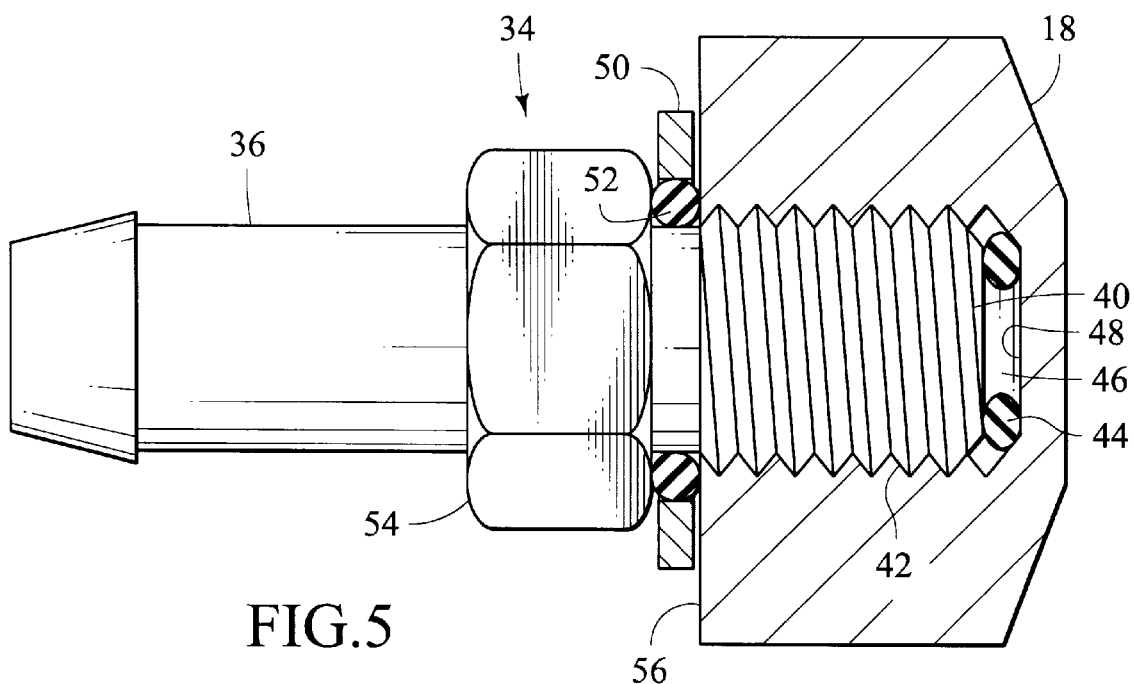
FIG. 5 is a partial side sectional view of a coupling for use at the oil outlet end of an apparatus in accordance with the present invention.

In one embodiment, the sealing element 18 comprises a metal cap having an inside female threaded portion 42, as shown in FIG. 5. When a threaded cap is used as the sealing element, the second end coupling 34 is configured to engage the sealing element 18 via a male threaded portion 40 on the second coupling. Preferably the outer surface of the cap 18 is polygonal shaped, preferably with 4 or 6 sides, to allow a tool such as a wrench to be employed to remove the cap 18 from the flexible fluid conduit 16. The metal cap 18 can be further provided with a seal such as O-ring 44 as shown in FIG. 5 to provide a fluid-tight seal between the end of the cap 18 and the end 46 of the second coupling 34. The seal 44 can comprise any resilient, oil-resistant material, such as butyl rubber. Preferably, the length of the threaded portion 40 of coupling 34 is longer than the length of the female threaded portion 42 inside cap 18 to ensure that the end 46 of the coupling 34 compresses the O-ring 44 against the inside surface 48 of the cap 18.

To further secure the sealing element 18 to the flexible fluid conduit, a washer 50 and gasket 52 can be provided as shown in FIG. 5. The washer 50 is preferably a metal washer, while the gasket 52 is preferably made of a resilient, oil-resistant material such as butyl rubber. To provide a shelf or surface against which the washer 50 and gasket 52 can be compressed by the face 56 of the cap 18, a polygonal portion 54 can be provided between the threaded portion 40 and the hose barb 36 of second coupling 34. The polygonal portion 54 of coupling 34 also provides a surface for a tool such as a wrench to securely engage the second coupling, allowing a second tool, such as a second wrench, to be used to loosen the sealing element 18 to allow oil to be drained from a crankcase. Providing the polygonal section 54 thus provides a mechanism to prevent torque from being transferred from the end cap 18 to the flexible fluid conduit 16 when the end cap is being removed. This will also prevent torque from being applied to the first end 12 of the apparatus at the crankcase, ensuring that the apparatus is not loosened from the crankcase during removal of the end cap 18. The length of threaded portion 40 of the second coupling 34 is selected to ensure compression of both the O-ring seal 44 inside the end cap 18, as well as the gasket 52 between the end cap face 56 and the polygonal portion 54.

In one embodiment, the apparatus of the present invention is provided with a securing device or securing mechanism to allow the free end 14 of the apparatus 10 to be secured during operation of the device to which the oil drain apparatus is connected. The securing device thus helps to reduce the chance that the apparatus 10, and particularly the flexible fluid conduit 16, will be mechanically damaged by impact with foreign objects and the like during use of the device to which it is connected. The securing device also functions to reduce vibration of the free end 14 during operation of the device to which the apparatus 10 is connected, which aids in reducing the opportunity for the sealing device 18 to be vibrated loose from the apparatus 10. One such securing device is shown in FIGS. 2 and 3. The securing device shown comprises a flexible thong 58, which has a first end 60 fitted about the flexible fluid conduit 16 proximate the clamp 30, as shown in FIG. 3. The thong 58 is shown in side view in FIG. 3.

Figure 6:
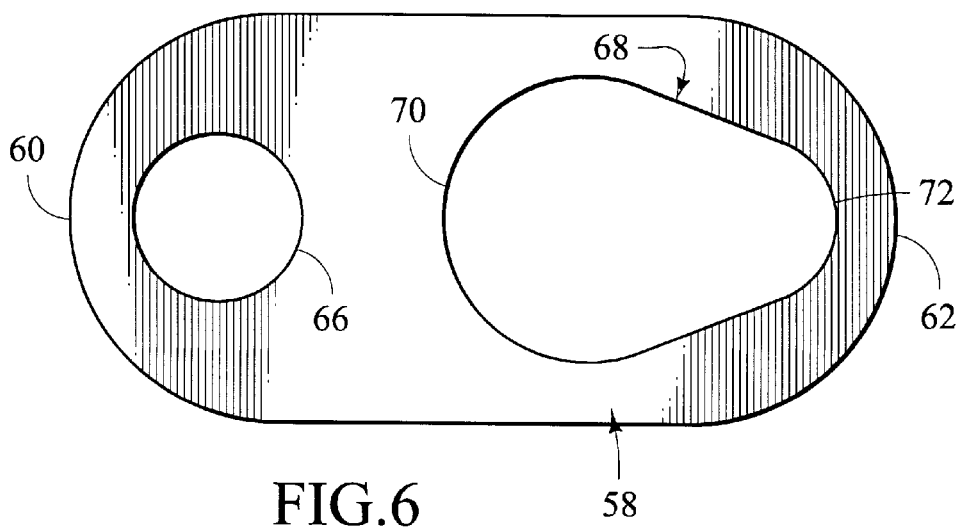
FIG. 6 is a detail of a fastener which can be used to secure a loose end of an apparatus in accordance with the present invention.

A front view of the thong 58 is shown in FIG. 6. The thong has a first opening 66 at first end 60 which is configured to receive the flexible fluid conduit 20. At the second end 62 of the thong there is a tapered second opening 68 which has a large end 70 configured to receive the sealing device 18. The smaller end 72 of the second opening 68 is contoured to fit the diameter of the flexible fluid conduit 16. When the first end 60 of the thong 58 is secured to the flexible fluid conduit 16 at the first end 12 of the apparatus 10 as shown in FIG.

Figure 8:
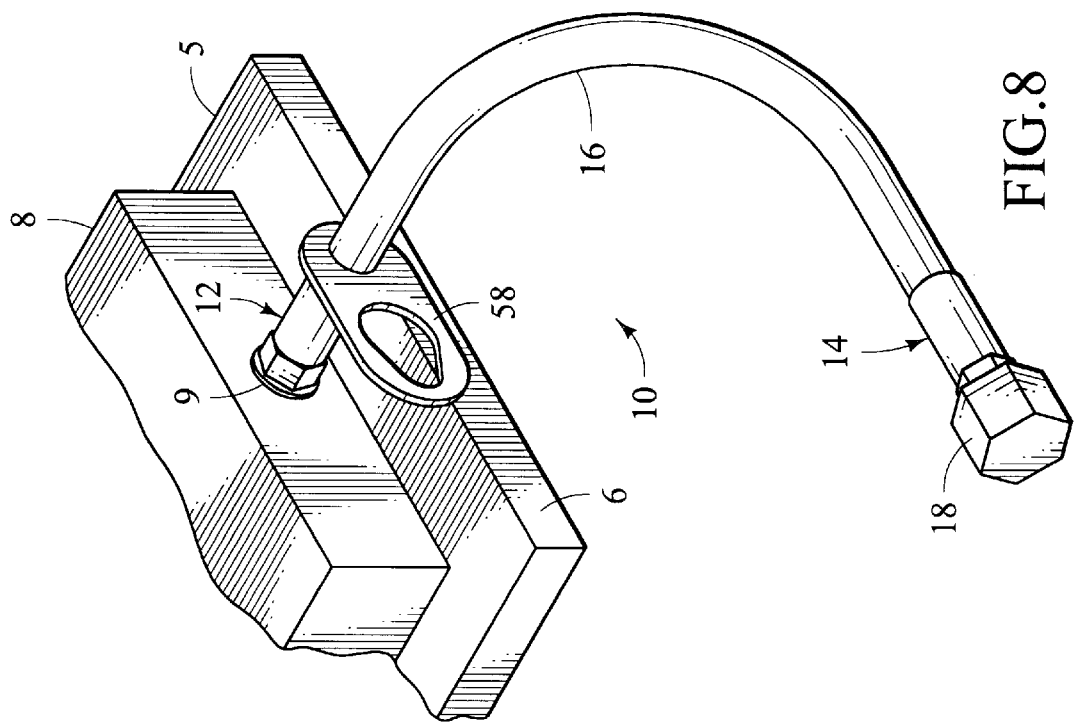
FIG. 8 is an isometric drawing showing an apparatus in accordance with the present invention with its loose end in an unsecured position.

3, the second end 62 of the thong hook is then available to engage the second end 14 of the apparatus 10 to hold it securely in place, as shown in FIG. 7. The tendency of the flexible fluid conduit 16 to straighten will lodge the flexible fluid conduit into the smaller end 72 of the second opening 68 of the thong 58. The flexible nature of the thong contributes to securing the second end 14 of the apparatus securely into the thong 58. In one embodiment, the thong 58 is fabricated from fiber reinforced oil resistant neoprene and is approximately 1/16 inch (2 mm) thick to allow the second end 14 of the apparatus 10 to be repeatedly engaged and disengaged from the securing device without damage to the securing device. The second end 14 of the apparatus 10 can be disengaged from the securing device 58 when the crankcase is to be drained, as shown in FIG. 8.

The operation of the apparatus will now be discussed. Preferably, the free end 14 of the apparatus 10 is secured in a relatively fixed position at all times, as shown in FIG. 7, until the apparatus 10 is to be put into service to drain oil from the crankcase 8. At the time that the oil is to be drained from the crankcase, the second end 14 of the apparatus 10 is freed from the securing device 58, and is moved past an edge 6 of the chassis 5, as shown in FIG. 8. The sealing element 18 is then removed from the second or free end 14 of the apparatus, and oil from the crankcase 8 is allowed to drain from the crankcase, through the flexible conduit, into a receptacle 64. Once the oil has finished draining from the crankcase 8, the sealing device 18 is replaced onto the second end 14 of the apparatus 10, and the free end 14 of the apparatus is secured in place using the securing device 58.

EXAMPLE

In one example, the apparatus is connected to a Honda GX390 four-stroke engine, which has a clearance of approximately 7/16 inch (10 mm) between the centerline of the drain hole and a surface on which the engine can be mounted. The Honda GX390 engine has an oil drain plug having a nominal diameter of 10 mm or 12 mm, with a 1.25 or 1.5 thread pitch, respectively. A 5/8 inch nominal hexagonal portion 32 of FIG. 2 provides sufficient clearance between the first end 12 of the apparatus and the top of the platform chassis 5 to allow the apparatus to be connected and disconnected from the engine. A 0.5 inch nominal outside diameter flexible fluid conduit 16, made of reinforced rubber tubing and having a 0.25 inch nominal inside diameter, provides a sufficient flow path for the oil to drain from the crankcase in a reasonable amount of time. An overall length for the apparatus of 14 inches is found to be sufficient in most applications to allow the oil to be easily drained into a receptacle past the edge of the chassis, such that no oil is spilled on the chassis or components mounted beneath the crankcase oil outlet during draining. This length, along with the aforementioned diameter of the flexible fluid conduit, allows the apparatus to be doubled back on itself as shown in FIG. 7 so that the free end 14 of the apparatus can be secured proximate the first end 12 without kinking the flexible fluid conduit.

Although the apparatus has been described with respect to an application to small engines, it is understood that it is equally applicable to lubricating crankcases for gearboxes and other applications where a crankcase oil drain outlet is located such that draining oil directly from the oil outlet is impractical or inconvenient due to interfering objects such as a supporting chassis.

While the above invention has been described with particularity to specific embodiments and examples thereof, it is understood that the invention comprises the general novel concepts disclosed by the disclosure provided herein, as well as those specific embodiments and examples.

I claim:

1. An apparatus for draining oil from a side-draining crankcase, the crankcase having an oil outlet, the crankcase being supported on a chassis defining edge portions distal from the oil outlet, the apparatus comprising:

a flexible fluid conduit having a first end and a second end and forming a fluid passageway there between;

a first coupling secured to the first end of the flexible fluid conduit and configured to be connectable to the oil outlet;

a sealing element removably connectable to the second end of the flexible fluid conduit; and wherein the oil outlet includes a female threaded portion to engage a male threaded drain plug, the first coupling further comprising at a first end of the coupling a male threaded portion configured to be compatible with the female threaded portion of the oil outlet; and further wherein the flexible fluid conduit is defined by an inside surface and an outside surface, and wherein the inside surface at the first end of the flexible fluid conduit comprises an elastomeric portion, and further wherein the first coupling comprises at a second end of the coupling a hose barb configured to engage the elastomeric portion at the first end of the flexible fluid conduit.

2. The apparatus of claim 1 wherein the first coupling further comprises a polygonal shaped section disposed between the male threaded portion and the hose barb, the polygonal shaped section being configured to accommodate a wrench.

3. The apparatus of claim 1 wherein the apparatus further comprises a clamp disposed about the outer surface of the first end of the flexible fluid conduit, the clamp being compressed about the first end of the flexible fluid conduit to securely engage the elastomeric portion at the first end of the flexible fluid conduit to the hose barb on the first coupling.

4. The apparatus of claim 2 wherein the polygonal section is sized so as to allow the first end of the first coupling to freely and threadably rotate within the oil outlet without contacting the chassis on which the crankcase is supported.

5. The apparatus of claim 4 wherein the male threaded portion of the first coupling is threaded at a pitch of one of approximately 1.25 or 1.5 and has a respective nominal threaded diameter of one of 10 mm or 12 mm, and further wherein the polygonal shaped section is sized to an S.A.E. nominal size of approximately 5/8 inch or less.

6. The apparatus of claim 3 wherein the clamp comprises a metal ferrule.

7. An apparatus for draining oil from a side-draining crankcase, the crankcase having an oil outlet, the crankcase being supported on a chassis defining edge portions distal from the oil outlet, the apparatus comprising:

a flexible fluid conduit having a first end and a second end and forming a fluid passageway there between;

a first coupling secured to the first end of the flexible fluid conduit and configured to be connectable to the oil outlet;

a sealing element removably connectable to the second end of the flexible fluid conduit; and a securing mechanism configured to removably secure the second end of the apparatus in a relatively fixed position; and wherein the securing mechanism comprises a flexible thong having a first opening and a second opening, the thong first opening being configured to receive the flexible fluid conduit proximate the first end thereof, and the thong second opening being larger at a first end proximate the thong first opening and smaller at a second end distal the thong first opening, the thong second opening first end being sized to allow the sealing element and flexible fluid conduit to pass there through, the thong second opening second end being configured securely engage the second end of the flexible fluid conduit in a removable manner.

8. An apparatus for draining oil from a side-draining crankcase, the crankcase having an oil outlet, the crankcase being supported on a chassis defining edge portions distal from the oil outlet, the apparatus comprising:

a flexible fluid conduit having a first end and a second end and forming a fluid passageway there between;

a first coupling secured to the first end of the flexible fluid conduit and configured to be connectable to the oil outlet;

a sealing element removably connectable to the second end of the flexible fluid conduit; and a second coupling configured to securely engage the sealing element to the second end of the flexible fluid conduit in a removable manner; and wherein the sealing element comprises an internally threaded cap, and wherein the second coupling comprises at a first end of the coupling a male threaded portion configured to be compatible with the internal threads of the cap; and further wherein the flexible fluid conduit is defined by an inside surface and an outside surface, and wherein the inside surface at the second end of the flexible fluid conduit comprises an elastomeric portion, and further wherein the second coupling comprises at a second end of the coupling a hose barb configured to engage the elastomeric portion at the second end of the flexible fluid conduit.

9. The apparatus of claim 8 wherein the second coupling further comprises a polygonal shaped section disposed between the male threaded portion and the hose barb, the polygonal shaped section being configured to accommodate a wrench.

10. An apparatus for draining oil from a side-draining crankcase, the crankcase having an oil outlet, the crankcase being supported on a chassis defining edge portions distal from the oil outlet, the apparatus comprising:

a flexible fluid conduit having a first end and a second end and forming a fluid passageway there between;

a first coupling secured to the first end of the flexible fluid conduit and configured to be connectable to the oil outlet;

a sealing element removably connectable to the second end of the flexible fluid conduit; and a second coupling configured to securely engage the sealing element to the second end of the flexible fluid conduit in a removable manner; and wherein:

the sealing element comprises an internally threaded cap, and wherein the second coupling comprises at a first end of the coupling a male threaded portion configured to be compatible with the internal threads of the cap;

the internally threaded cap is defined by a closed end, and wherein the cap further comprises an elastomeric seal configured to generate a liquid tight seal between the male threaded portion of the first end of the first coupling and the closed end of the cap; and the second coupling further comprises a polygonal shaped section disposed between the male threaded portion and the hose barb, the polygonal shaped section being configured to accommodate a wrench, the second coupling further comprising a washer and a flexible gasket disposed about the second coupling between the polygonal shaped section and the male threaded portion, wherein the gasket is configured to be compressed against the polygonal shaped section by the end cap when the end cap is threaded onto the male threaded portion of the second coupling.

11. The apparatus of claim 8 wherein the apparatus further comprises a clamp disposed about the outer surface of the second end of the flexible fluid conduit, the clamp being compressed about the second end of the flexible fluid conduit to securely engage the elastomeric portion at the second end of the flexible fluid conduit to the hose barb on the second coupling.

* * * * *